United States Patent
Huang et al.

(10) Patent No.: US 6,493,075 B1
(45) Date of Patent: Dec. 10, 2002

(54) METHOD TO ADJUST THE RANGING OF THE MODULATION TRANSFER FUNCTION, MTF, OF A SENSING SYSTEM

(75) Inventors: Chih-Wen Huang, Hsinchu (TW); Yin-Chun Huang, Hsinchu (TW)

(73) Assignee: Umax Data Systems, Inc. (TW)

( * ) Notice: Subject to any disclaimer, the term of this patent is extended or adjusted under 35 U.S.C. 154(b) by 181 days.

(21) Appl. No.: 09/711,411

(22) Filed: Nov. 13, 2000

(51) Int. Cl.⁷ ......................... G01M 11/00; G02B 26/08
(52) U.S. Cl. .................. 356/124.5; 359/212; 359/900; 355/55; 355/77
(58) Field of Search ................ 356/124.5, 124, 356/125, 126, 127; 359/196–275, 223, 900; 355/55, 77

(56) References Cited

U.S. PATENT DOCUMENTS

| | | | |
|---|---|---|---|
| 4,984,013 A | * 1/1991 | Terashita | 355/77 |
| 5,726,746 A | * 3/1998 | Park et al. | 356/124.5 |
| 5,966,209 A | * 10/1999 | Cheng et al. | 356/124.5 |
| 6,222,934 B1 | * 4/2001 | Tsai | 382/112 |
| 6,344,916 B1 | * 2/2002 | Chiu | 359/212 |

* cited by examiner

*Primary Examiner*—Hoa Q. Pham

(57) ABSTRACT

A Method to adjust the Ranging of the Modulation Transfer Function, MTF, of a Sensing System, more specifically, it provides for the preparation of a Test Chart of Modulation Transfer Function, of standard specification, and further, for the detection of the Modulation Transfer Function, MTF, for positions differing in picture depths, based on the location and size of said Test Chart, or alternatively on a variation in the thickness of the Crown Glass, whereby the acquisition of an applicable ranging of picture depth is achievable, which in turn provides a method of prompt derivation of a ranging scope of picture depths accommodating easy operation in the course of focal adjustment in workshop production of scanners.

14 Claims, 6 Drawing Sheets

METHOD TO ADJUST THE RANGING OF THE MODULATION TRANSFER FUNCTION, MTF, OF A SENSING SYSTEM

FIELD OF THE INVENTION

A Method to adjust the Ranging of the Modulation Transfer Function, MTF, starting with the preparation of a Testing Chart for the Modulation Transfer Function, MTF, of a standard specification, a plurality of Testing Chart of different Resolutions may be run to obtain an applicable ranging of picture depths.

BACKGROUND OF THE INVENTION

Along with brisk growth of the computer industry in our times, almost at shooting speeds, peripheral industries have progressed and are prospering in like measures, taking scanners, for example, just a few years ago it was still a peripheral product of prohibitive price, yet, due to phenomenal advances in technologic breakthrough and consistent downgrading of the prices of electronic parts and components, nowadays one who is a user of a computer, PC, in particular, can purchase a scanner at very affordable prices, a scanner serving to sweep manuscript or graphic files of routine use to enterprises or individuals into the computer for storage and ultimate usage, in mass application, can save much of the time otherwise needed to produce or prepare graphic files, in addition, scanner can be used to run, that is, to produce web pages of an INTERNET, with plenty of graphic presentation on the web page more people would be allured to run access to the pages, whereby an entrepreneurial goodwill is conveyed leading eventually to unlimited business opportunities, to be fair and frank, the ongoing popularity of INTERNET, going on stronger from day to day, owes a lot to what scanner has played in the process, yet the working quality of a scanner is by and large dictated by factors like resolution capability, focal distance, among others, and these determine the quality feature of a scanner, and it goes without saying as to the importance of adjustments of focal distance and of resolution in the course of production.

Generally, in the procedure of either design or production of a workshop of graphic or video scanners, focal adjustment is always a key processing phase, because there lies the crucial point for a graphic file eventually appearing on a computer display screen to be clear enough or not once the scanner that is being produced in the workshop, duly mounted and assembled, available for operation, executes its duty in use. Referring to FIG. 1, a side view of a process-in-action of focal adjustment with the Test Chart being supported by two Holders, pursuant to a prior art, more specifically, it is seen that the Test Chart 10 is supported on both sides below, either side on a holder 11 which in turn bears against a scanning bearing face 12, of light permeable substance, down said scanning bearing face 12 are provided, on suitable locations; one or more reflector 21, one lens 22 and one video sensor 23 (CCD), in the focusing procedure as executed conventionally, a Test Chart 10 is set on the upper surface of the scanning bearing surface 12, and, following a scanning test run with a Video Detector 23, the holder 11 will be replaced with one which stands higher one by one continually, with the result in each execution recorded on completion of scanning performed with the Video Sensor 23, so as to draw a Distribution Curve of the Modulation Transfer Function, MTF, in the long run.

With the framework and methodology used to test the Modulation Transfer Function, MTF, in a conventional production procedure, summarized in the foregoing, it is a pity to note that in productive adjusting and testing procedures using a scanner, constrained by the fact that the height of each supporting holder is fixed, only one unique, acceptable Modulation Transfer Function, MTF, can be achieved, and that is by far not the optimum accurate value, moreover, with a conventional approach, whatever the art, multiple runs must be made in view of replacements of precision holders of different heights, if only it matters to obtain different Modulation Transfer Function, MTF, and that will cost much precious time while there is still a long way to go arriving at a linear distribution curve of the MTFs, and that is awfully disadvantageous in so far as judgment on focal adjustment in a production procedure is concerned, and there lies a target demanding immediate improvement for professionals engaged in the art.

The Method to adjust the Modulation Transfer Function, MTF, of a Sensing System, as taught according to the invention is aimed at achieving predetermined adjustment of the ranging of Modulation Transfer Function, MTF, in a single execution, thus eradicating once for all, the complicated procedures in previous arts which were common in that, throughout the procedure of adjustment of Modulation Transfer Function, the value obtained as the outcome of the adjustment makes but for a specific point in the ranging of acceptable MTF, there being no assuring as to whether the ranging of the adjustment lies within a predetermined and accepted limit, so the invention is introduced to bring the value of the MTF within an acceptable ranging, the method being controllable, thanks to the creation of Test Charts designed for that MTF ranging and the novel design of Testing Instruments covered under the invention; while on the other hand, as ordinarily a scanner must be matched with a machine console available with permeable light sources, and the focal side for scanning reflection and that for permeation are usually not the same one side, which can often result in a value of reflective Modulation Transfer Function that is accepted not being acceptable to the Permeation Modulation Transfer Function, and that is due to the fact that the ranging acceptable respecting the Modulating Transfer Function has come to an extent smaller than Reflection/Permeation Side by side Differential compounded by the inability to control the ranging while the adjustment is in progress, in view of such problems the invention provides a method to adjust the Ranging of the Modulation Transfer Function, MTF, of a Sensing System.

SUMMARY OF THE INVENTION

As a method to adjust the ranging of the Modulation Transfer Function of a Sensing System, the invention serves to prepare the Test Chart to test the Modulation Transfer Function, MTF, for a standard value, on different resolution parameters, next, testing conditions such as location of the Test Chart, Density of the Line Pair are changed to obtain Modulation Transfer Functions per positions differing in picture depth, in order for the Modulation Transfer Functions thus realized to comply with standard product specifications.

Technically, the principle of operation of the invention is that an incident light beam, on passage through a dielectric in an ambience of air, will incur a focal displacement, so by the intervention of a dielectric in an optic path followed by varying the thickness, location of the dielectric, it is possible to detect a Modulation Transfer Function, MTF.

For a preferred execution, have the machine console of a scanner laid on the Modulation Platform, as pursuant to the invention, run an analysis using computer data to pass an adjudgement as to whether an adjustment to an optimum setting for the ranging of Modulation Transfer Function has been reached, in the negative case run a successive scanning test by means of a simple control system, until a controllable range of Modulation Transfer Function is obtained.

For still another preferred execution, let the position of the focus be changed by taking into account differences in deflection rates, of given dielectrics, such as: thick glass, plasticized resin, etc., to incident beams, concurrently with Test Chart for MTF for Libe Pair, laid on different positions, so as to obtain an optimum ranging for Modulation Transfer Function.

For still another preferred execution, by the size of the Line Pair on the Test Chart, determine an optimum value for the Modulation Transfer Function and the Ranging acceptable for the product, so as to obtain an optimum ranging of Modulation Transfer Function.

Once applied, the invention Method to adjust the Ranging of the Modulation Transfer Function, MTF, of a Sensing System will effectively improve existent arts without having to adjust the focal distance of the scanner by altering the height of the supporting holders, saved altogether are time and vulnerability to imprecision, the invention also lends easily a distribution chart of a continuously linear Modulation Transfer Function, which may be advantageously employed to effectively adjust both the Sensor and the Lens to an optimum position in the course of production of scanner products, whereby an optimum ranging of Modulation Transfer Function is obtainable.

Other features and advantages of the invention can be better appreciated as to its operational capabilities by following through the following detailed descriptions given by way of example, illustrated in the accompanying drawings.

DETAILED DESCRIPTION OF THE INVENTION

The invention provides a method of adjustment of the Ranging of Modulation Transfer Function, MTF, of a Sensing System, more specifically, it provides for the preparation of a Test Chart of a standardized Modulation Transfer Function, MTF, basing on different resolutions, and, basing on the location, size of said Test Chart, or by varying the thickness of the Crown Glass, it provides for detection of the Modulation Transfer Function, MTF, per different picture depths, wherefrom an applicable picture depth is obtained, and that makes possible an easy to operate, effective method to acquire picture depths in the course of focal adjustment in the production of scanners.

Figure 1:
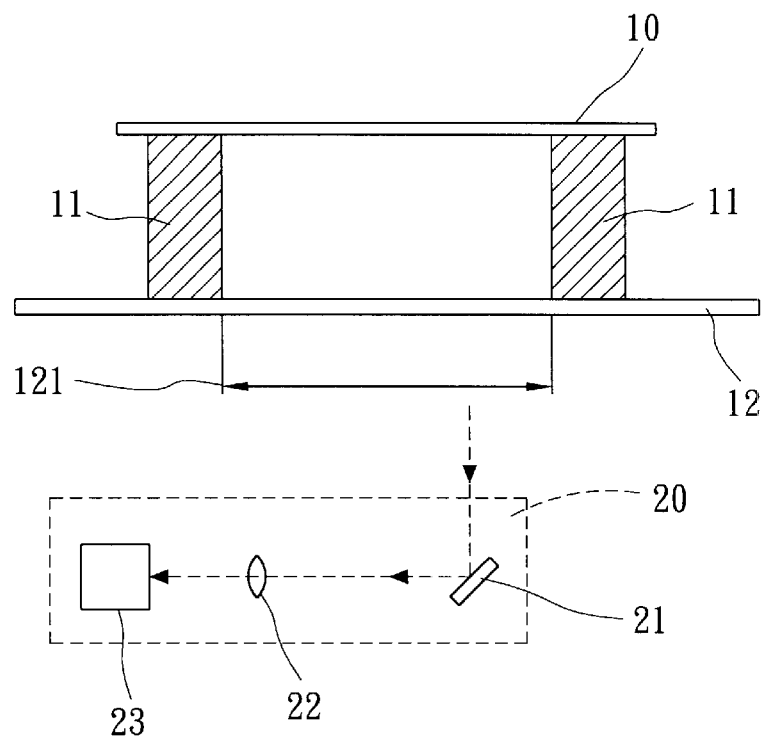
FIG. 1 is a side view of the cross-section of a Test Chart supported edgeways by a pair of holders to facilitate focal adjustment, pursuant to a prior art.
Figure 2:
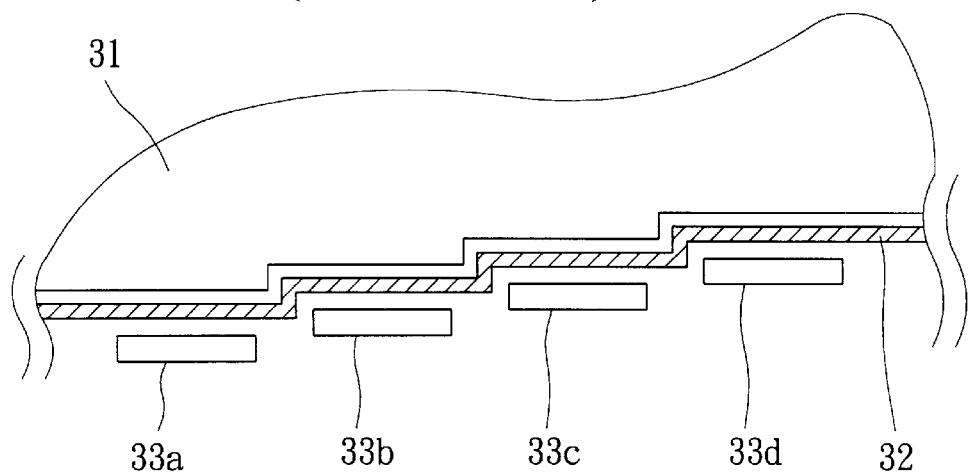
FIG. 2 illustrates a layout of an ad hoc Testing Adjustment Apparatus by laying a plurality of homogenous dielectric and Test Charts in front of a stair board; according to the invention.

Referring to FIG. 2, illustration of a layout of an ad hoc Testing Adjustment Apparatus by laying a plurality of homogenous dielectric and Test Charts in front of a stair board, as according to the invention, it is seen of a specific Chart 32 lying on the surface of the stair board 31, in front of the Test Chart 32 there lay a plurality of dielectric, including: a first dielectric 33a, a second dielectric 33b, a third dielectric 33c and a fourth dielectric 33d, the specific length measuring way from the scanning module (not shown in the drawings) to each stair board 31, that is, Total Track, TT, is representative of a specific ranging of limpidity, being different from each other, for example, once a clear image is produced by having a first dielectric 33a inserted in the optic path of the scanning module, the ranging of limpidity is then adjudged accepted, scoring over 60 points on a percentile scale; whereas should another clear image be made available by having a fourth dielectric 33d introduced in the optic path of the scanning module, that secured with a longer overall Total Track, being justified for that reason, the scoring may be fixed to be 90 points or so, a further advantage of the invention is that it is possible to determine different resolutions without having to lay a number of dielectrics, such as 33a33b33c33d, in front of the Test Chart as a precondition for the benefit, additionally, the scanning module comprising: a lens, a charge coupling device CCD, and a plurality of reflection mirror will determine, through testing procedures, pictures of different resolutions by which to derive the scope of distribution of Modulation Transfer Functions as well as optimum resolution points.

Figure 3:
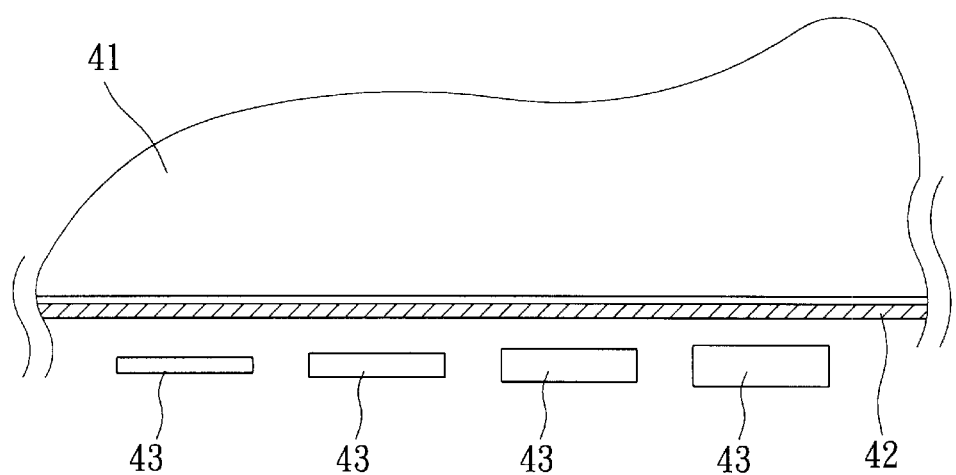
FIG. 3 illustrates a layout of an ad hoc Testing Adjustment Apparatus with the Test Chart and a plurality of dielectric of different thicknesses laid in front of a platform employed according to the invention

Referring to FIG. 3, illustration of layout of an ad hoc Testing Adjustment Apparatus with the Test Chart and a plurality of dielectric of different thicknesses laid in front of a platform employed according to the invention, it is seen of a specific Test Chart 42 lying on the surface of the platform 41, so that by varying the thickness of the dielectric 43, lining up in a row in a thickening order, a positional shift of the focus is attained, by the same token, once a clear picture is obtained by introducing the thinnest dielectric 43 as appearing on the leftmost side into the Total Track by means of the scanner module, the ranging of resolution thus achieved is deemed satisfactory, scoring 60 points on the percentile scale; while on the other hand, with the thickest dielectric 43 introduced in the Total Track of the scanning module, that is, the intervention being made with the dielectric 43 on the rightmost side, and a clear picture is rendered thereby, then owing to a longer Total Track on the run, the scoring may reach as high as 90 points, by producing still another different picture by scanning with another scanning module (not shown in the drawings), with calculations performed thereon it is possible to realize an applicable ranging of distribution of Modulation Transfer Function, and further more, to derive an optimum resolution point.

Figure 4:
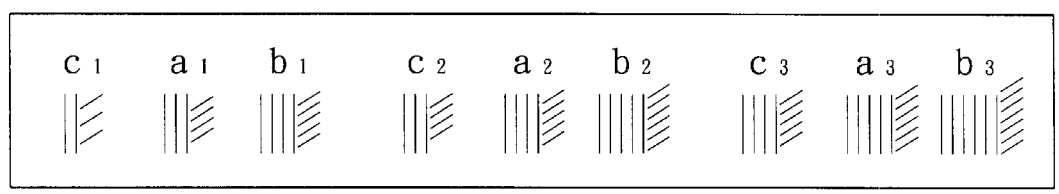
FIG. 4 illustrates a Test Chart for Line Pairs bearing dissimilar resolutions, according to the invention

Referring to FIG. 4, illustration of a Test Chart for Line Pairs bearing dissimilar resolutions according to the invention, it is seen of a plurality of Line Pair on the Test Chart, the Line Pair being each a combination of plural straight lines with plural slant lines, a1a2a3 being line pairs of a same original resolution, and the Test Chart being one that is mostly employed pursuant to conventional arts, the ranging of resolution being a1a2a3; with b1b2b3 being a Line Pair of a High Resolution, such that b1b2b3; and c1b2 c3 being a Line Pair of a low Resolution, such that c1c2c3, Line Pairs assembled into a picture set pursuant to permutation in the order cab, by performing a traverse-going sweeping of each picture sets with a scanning module (not shown in the drawings), pictures differing in focal limpidity ranging from a lower resolution to a higher resolution will be obtained since the picture sets themselves are dissimilar in level of resolutions, next, basing on the assembly of scanned pictures a Modulation Transfer Function may be derived, by a distribution chart of the Modulation Transfer Functions it is possible to derive a meaningful, that is, an applicable ranging of focal adjustments.

Figure 5:
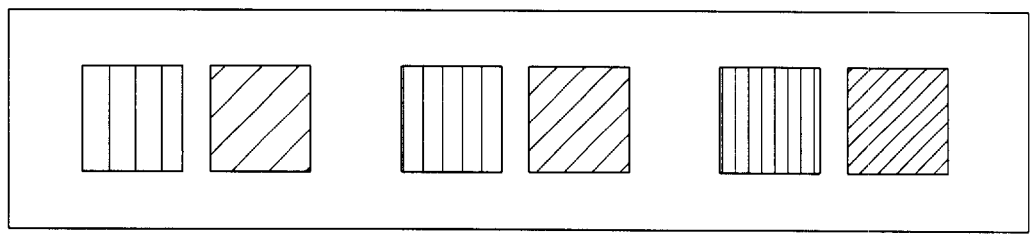
FIG. 5 illustrates another Test Chart covering otherwise configured Line Pairs featuring different resolutions, according to the invention

Referring in succession to FIG. 5, illustration of another Test Chart for Line Pairs bearing otherwise configured Line Pairs featuring different resolutions according to the invention, it is seen of a number of picture sets comprising two blocks of juxtaposed Line Pairs, with one picture embodying a plurality of vertical lines, and another, of slant lines, the line to line spacing is the greatest in the leftmost picture block (the smallest in density), and said line to line spacing dwindling rightwardly (the density increasing gradually in the rightward direction), such that the picture with the smallest line to line spacing, that is, with the greatest density, is the rightmost one, by running a traverse-going sweeping with a scanner module(not shown in the drawings), it is possible to derive a useful Modulation Transfer Function, MTF, out of pictures being sweeped therewith.

Figure 6:
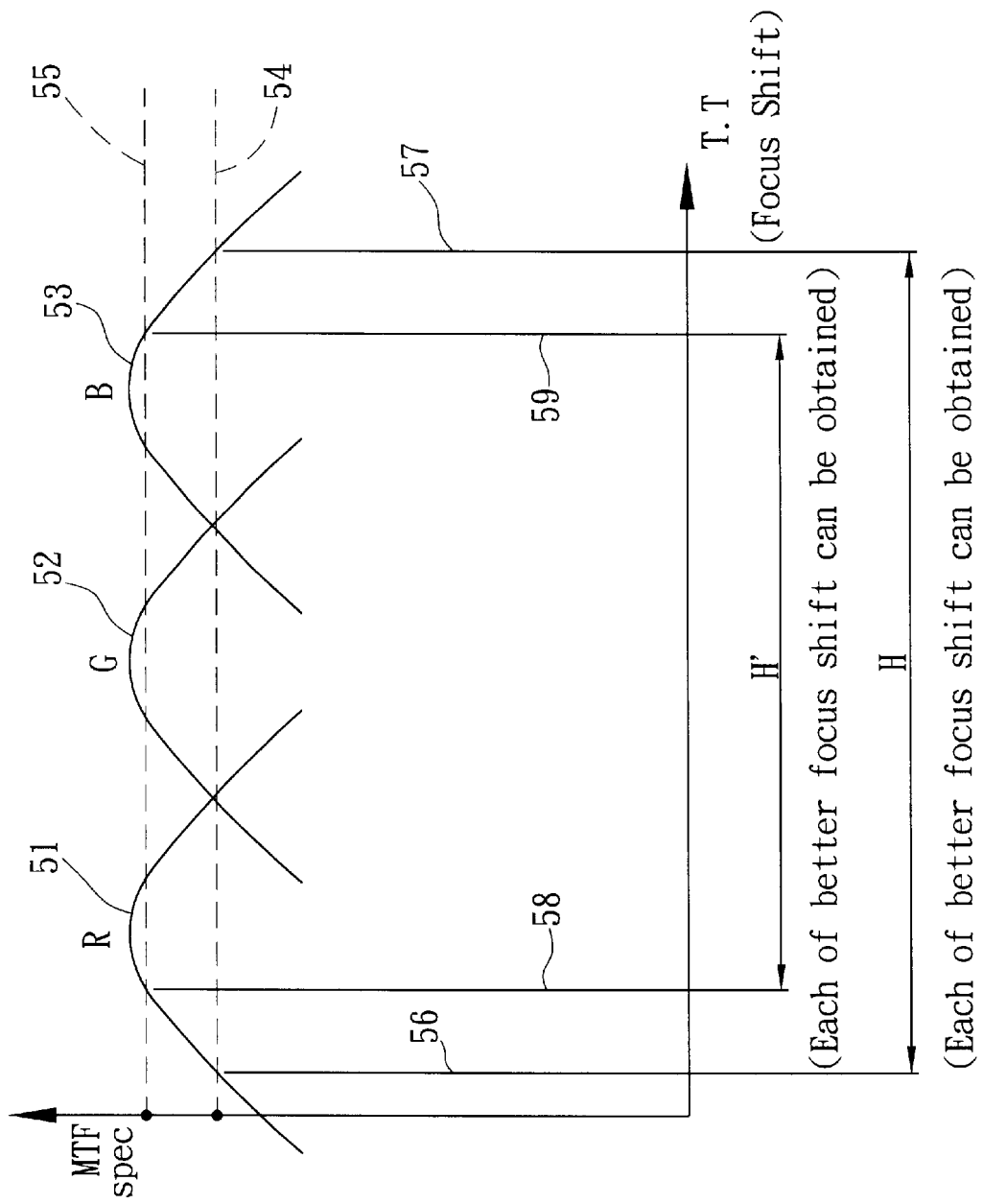
FIG. 6 illustrates distinguishment of the limpidity of focal distance using MTF Distribution Chart, according to the invention

Referring now to FIG. 6, illustration of distinguishment of the limpidity of focal distances using MTF Distribution Chart, as according to the invention, whereof the abscissa is used to denote Focus Shift, and the ordinate the scope of MTF being drawn, with the chart comprising: Distribution Curve 51 for the red light relevant MTF, Distribution Curve 52 for the green light relevant MTF, Distribution Curve 53 for the Blue Light relevant MTF, etc., three curves overlapping consecutively, by running a straight line segment 54 of a lower limpidity range across the overlapped sections of said triplicate curves in reference to the abscissa, that is, the X axis, we can obtain a left line segment 56 and a right line segment 57 each representing a Focus Shift, such that picture limpidity covered in the ranging H, while being within a useful ranging all right, is such that it fails to yield a better level by which to produce a better picture in terms of a better limpidity, yet by putting into practice examples of Modulation Transfer Function illustrated in FIG. 2 through FIG. 5, a straight line 55 of a better limpidity ranging can be obtained, next, by running said straight line 55 of a better limpidity ranging across the overlapping area covered by the three Distribution Curves in referring to the X axis, a left line segment 58 and a right line segment 59 each of a better Focus Shift can be obtained, with relevant ranging H' easily useful for application in Focal Adjustment Procedures in the course of production of scanner apparatus.

Figure 7:
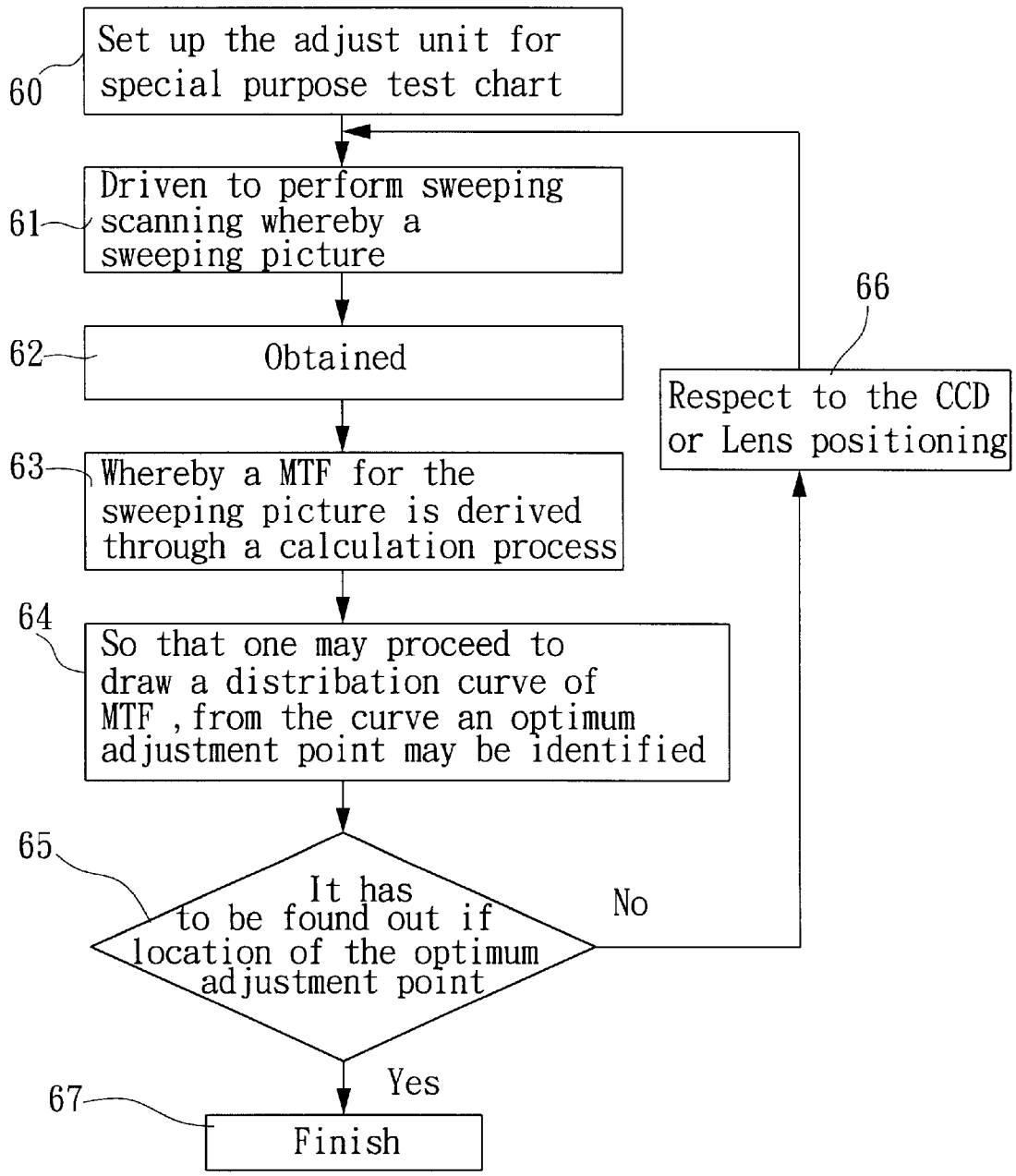
FIG. 7 is a flow chart of the invention method pursuant to a fully automatic focal adjustment approach.

Referring to FIG. 7, a flow chart of the invention method pursuant to a fully automatic focal adjustment approach, it is seen to comprise, for the implementation of the method; a special testing Adjust Unit, a special purpose Test Chart, a scanner module which consists of: a Lens, a charge coupling device CCD and appropriate software control programs, for implementation the first step is to set up the Adjust Unit 60 for special testing purpose, exemplified in the embodiments shown in FIG. 2 through FIG. 5, next, a scanner module 61 is driven to perform sweeping scanning whereby a sweeping picture 62 is obtained, whereby a Modulation Transfer Function 63 for the sweeping picture is derived through a calculation process, so that one may proceed to draw a Distribution Curve of Modulation Transfer Functions, from the curve an optimum Adjustment Point 64 may be identified, still, it has to be found out if the location of the optimum adjustment point 64 complies with Specification 65, in the negative case adjustment will be made with respect to the CCD or Lens 66 positioning, concurrently with execution of steps 61–64 in an effort to search for an optimum adjustment point; once step 65 has proven consistent with the ranging of applicable specifications, execute Termination 67.

Figure 8:
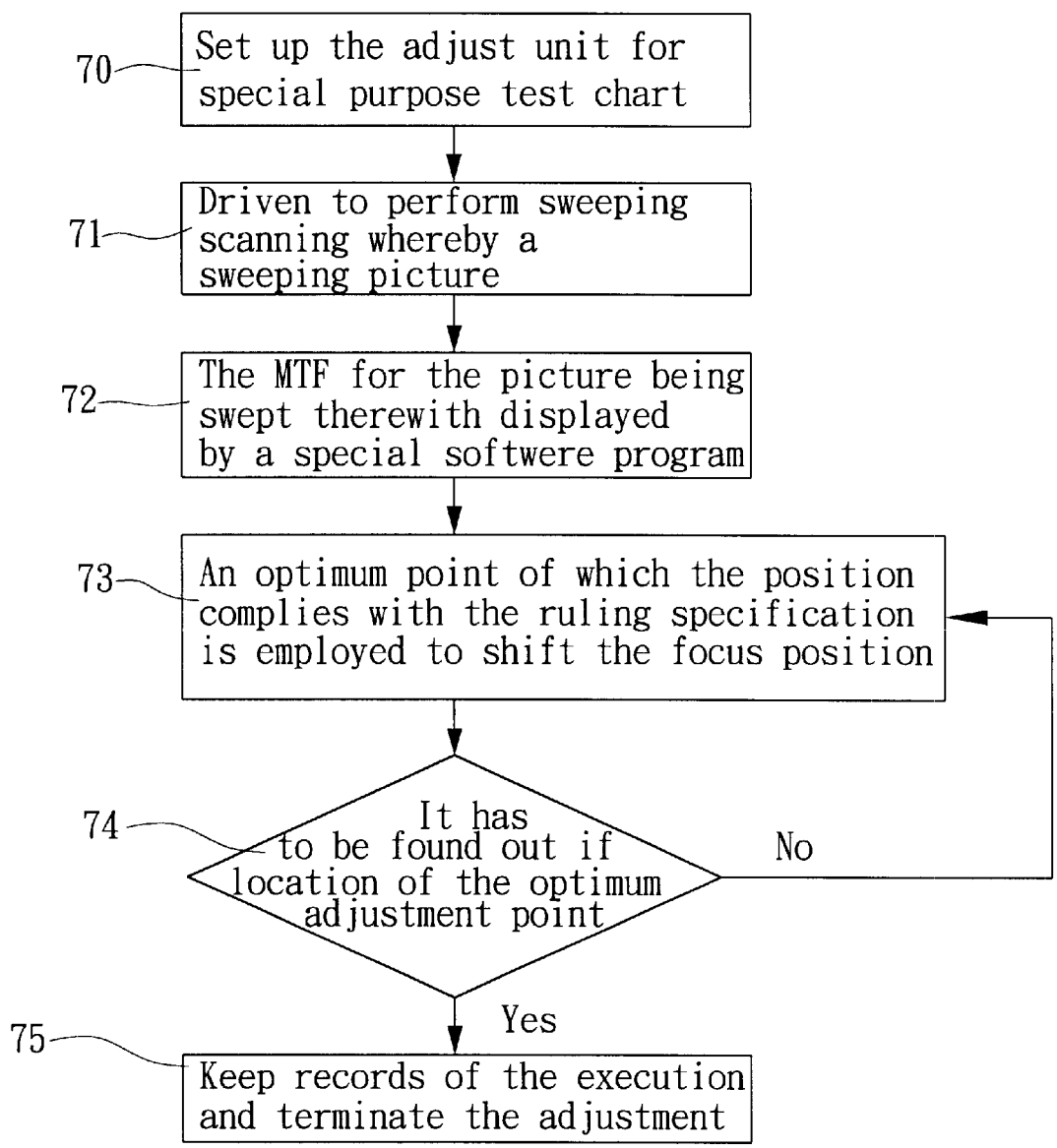
FIG. 8 is a flow chart of the invention method pursuant to a semiautomatic focal adjustment approach.

Referring now to FIG. 8, flow chart of the invention method pursuant to a semi-automatic focal adjustment approach, it is seen that the implements used to execute the invention method comprise: adjustment unit for special testing purposes, a special purpose test chart, a scanner module which consists of: a Lens, a Charge Coupling Device CCD, software program for display of special purpose tests, for execution, set up in the first place the adjustment unit 70 rightly covered in the embodiments illustrated in FIG. 2 through FIG. 5, drive a scanner module to perform sweeping scanning 71, with the modulation transfer function 72 for the picture being swept therewith displayed by a special software program, to follow that, an optimum point of which the position complies with the ruling specification is employed to shift the focus position 73 to verify if the optimum adjustment point lies on a position consistent with specification 74, in the negative case skip back to step 73 to continue shifting the focus until a position consistent with the specification is reached; where the outcome of execution fulfills the required specification position, keep records of the execution and terminate the adjustment 75.

What is claimed is:

1. Apparatus to adjust the ranging of the modulation transfer function of a sensing system, comprising:
   a stair board, whereof the surface takes the form of a step bearing a layon top irregular in depths;
   a test chart complete with a plurality of line pairs on the surface, and as positioned on the surface of a stair board;
   a scanner module, from which an optic path runs to sweep said test chart, whereby value of a specific focal distance is derived.

2. Apparatus to adjust the ranging of the modulation transfer function of a sensing system according to claim 1, whereof a plurality of dielectric are introduced way between the scanning module and the test chart, serving to change the focal point when the scanning module runs a sweeping scanning.

3. Apparatus to adjust the ranging of the modulation transfer function of a sensing system according to claim 2, whereof said dielectric as employed is Crown Glass or otherwise material capable of varying the overall length of the light journey.

4. Apparatus to adjust the ranging of the modulation transfer function of a sensing system according to claim 1, whereof said line pair on the test chart is executed to be line segments running vertically, traversely, or at a slope.

5. Method to adjust the ranging of the modulation transfer function of a sensing system according to claim 1, whereof said scanning module comprises: a lens, a Charge Coupling Device (CCD), and a plurality of mirror.

6. Apparatus to adjust the ranging of the modulation transfer function of a sensing system, comprising:

a platform, bearing a test chart on the surface;

a test chart, bearing a plurality of line pair on the surface, and as positioned on the surface of a stair board;

a scanning module, from which an optic path runs through said test chart to yield a specific focal distance;

a plurality of dielectric, interposed way between said scanning module and test chart, serving to change, that is, modify the focal point of the scanning module when the scanning sweep is in action.

7. Apparatus to adjust the ranging of the modulation transfer function of a sensing system according to claim 6, whereof by gradually increasing the thickness of the said plurality of dielectric, pictures characterized by different focus shifts concurrent with the scanning sweep, are realized.

8. Apparatus to adjust the ranging of the modulation transfer function of a sensing system according to claim 6, whereof said line pair is executed to be vertically going, traversely going, or gradient line segments.

9. Method to adjust the ranging of the modulation transfer function of a sensing system according to claim 6, whereof said scanning module comprises: a lens, a Charge Coupling Device (CCD), and a plurality of mirrors.

10. Method to adjust the ranging of the modulation transfer function of a sensing system pursuant to a fully automatic focal adjustment approach, comprising:

(a) adjust device for special tests, provided ad hoc;

(b) transmitting a scanning module to run scanning sweep;

(c) obtaining a swept picture;

(d) calculating the modulation transfer function, MTF, for said swept picture;

(e) drawing up a distribution curve for said modulation transfer function, from which to find an optimum adjustment point;

(f) reaching a decision as to whether said optimum adjustment point lies on a position consistent with specification;

(g) adjusting the Charge Coupling Device (CCD) or lens position;

(h) completion.

11. Method to adjust the ranging of the modulation transfer function of a sensing system pursuant to a fully automatic focal adjustment approach according to claim 10, whereof should the outcome of the execution of step (f) be in the negative case, proceed to execute step (g) followed by prosecution of step (b) through step (e) again.

12. Method to adjust the ranging of the modulation transfer function of a sensing system pursuant to a fully automatic focal adjustment approach according to claim 10, whereof step (h) is prosecuted directly in the affirmative case of the outcome of the execution of step (f).

13. Method to adjust the ranging of the modulation transfer function of a sensing system pursuant to a semiautomatic focal adjustment approach, comprising:

(i) adjust device for special tests, provided ad hoc;

(j) transmitting a scanning module to run scanning sweep;

(k) displaying of the modulation transfer function for said swept picture by means of a specific software program;

(l) resolving an optimum position per specification, with which to shift the lens position;

(m) reaching a decision as to whether said optimum adjustment position complies with specification;

(n) making records and terminate the adjustment procedure.

14. Method to adjust the ranging of the modulation transfer function of a sensing system pursuant to a semiautomatic focal adjustment approach according to claim 13, whereof should the outcome of the execution of step (m) be in the negative case, skip back to step (l) to shift the lens position.

* * * * *